United States Patent
Borg et al.

(10) Patent No.: US 6,959,548 B2
(45) Date of Patent: Nov. 1, 2005

(54) ADJUSTABLE PYROTECHNIC-GAS SHOCK ABSORBER

(75) Inventors: Evrard Borg, Sanary (FR); Laurent D'Emmanuelle, Toulon (FR); Eric Laspesa, Six Fours (FR); Jean-Paul Nadeau, Ollioules (FR)

(73) Assignee: Pyroalliance, les Mureaux (FR)

( * ) Notice: Subject to any disclaimer, the term of this patent is extended or adjusted under 35 U.S.C. 154(b) by 0 days.

(21) Appl. No.: 10/844,390

(22) Filed: May 13, 2004

(65) Prior Publication Data

US 2005/0000766 A1  Jan. 6, 2005

(30) Foreign Application Priority Data

Jun. 13, 2003  (FR) .............................................. 0307105

(51) Int. Cl.[7] .............................................. F01B 29/08
(52) U.S. Cl. .......................................... 60/632; 60/638
(58) Field of Search ......................... 60/632, 633, 634, 60/636, 638

(56) References Cited

U.S. PATENT DOCUMENTS

| | | | | |
|---|---|---|---|---|
| 2,903,849 A | * | 9/1959 | Fawcett et al. ................ | 60/638 |
| 3,103,851 A | * | 9/1963 | Rosenblum et al. .......... | 89/1.4 |
| 3,320,740 A | * | 5/1967 | Hamkins ...................... | 60/633 |
| 5,303,631 A | | 4/1994 | Frehaut et al. | |
| 2001/0035643 A1 | | 11/2001 | Mueller | |

FOREIGN PATENT DOCUMENTS

| | | |
|---|---|---|
| DE | 199 45 844 A1 | 3/2001 |
| EP | 0 550 321 A1 | 7/1993 |
| FR | 2 494 664 | 5/1982 |

\* cited by examiner

*Primary Examiner*—Hoang Nguyen
(74) *Attorney, Agent, or Firm*—Oliff & Berridge, PLC

(57) ABSTRACT

The technical field of the invention is that of motor vehicle safety involving energy absorption systems for damping the displacement of certain parts that are put into motion at the time of a mechanical collision between the motor vehicle and an externals object.

The subject of the present invention relates to an energy absorption system for safety devices in a motor vehicle, comprising a pyrotechnic gas generator and a sliding position that can be displaced in a damping chamber, the said generator being able to release gas into the said chamber in order to damp the piston.

The main characteristic of this system is that the gas generator delivers a variable quantity of gas and the damping chamber comprises a pressure-regulating device that is triggered above a threshold pressure.

20 Claims, 3 Drawing Sheets

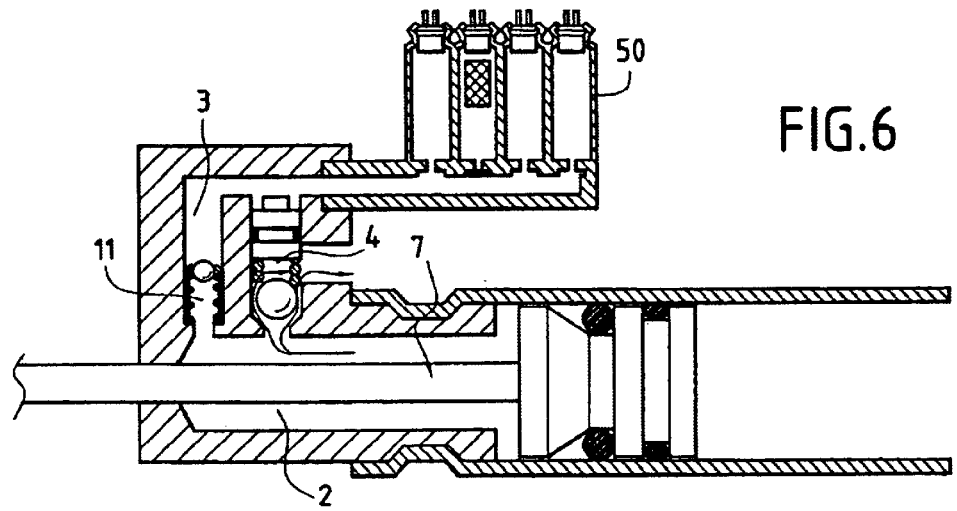
FIG.6
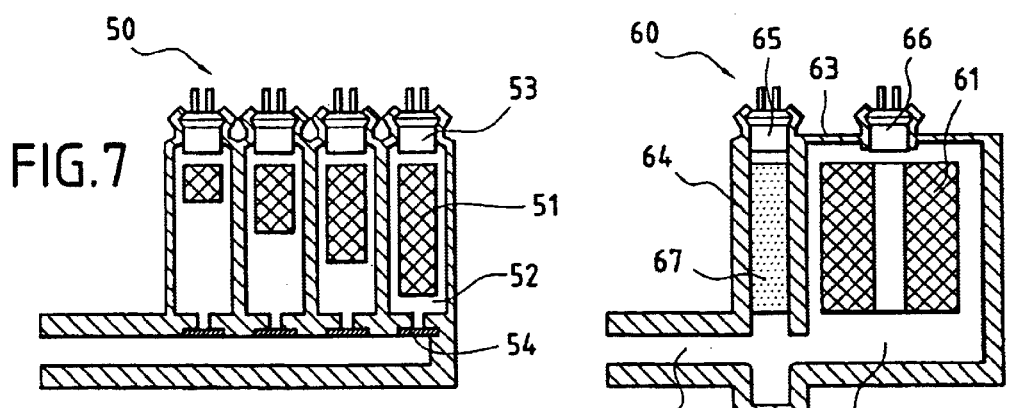
FIG.7
FIG.8
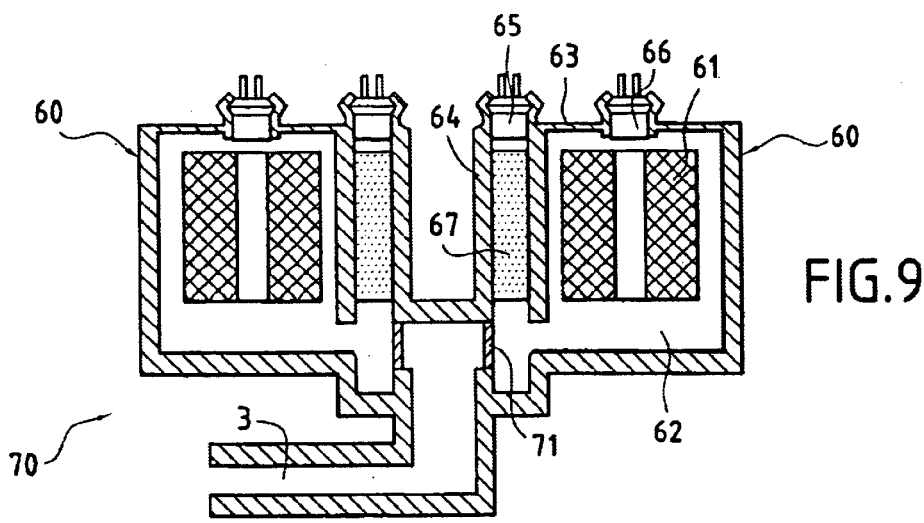
FIG.9

ADJUSTABLE PYROTECHNIC-GAS SHOCK ABSORBER

The technical field of the invention is that of motor vehicle safety involving energy absorption systems for damping, for example, the displacement of certain parts that have been put into motion at the time of a mechanical collision between the motor vehicle and an external object and that, if they are not damped, are liable to cause serious injuries at the time of impact.

The absorption systems according to the invention may more particularly be adapted, for example, to damp a bumper of a motor vehicle in the event of a low-speed head-on collision of the vehicle, to protect the lower limbs of an occupant of a motor vehicle, to damp the impact of a pedestrian against the bonnet of the vehicle, to adjustably limit, at the time of an impact, the force exerted by an occupant of a motor vehicle on his seatbelt, or to damp the impact of the driver against a steering column. Unless they are damped, these various parts, in particular the bonnet or the steering column, may constitute a fixed stop with respect to the pedestrian or the driver that is capable of becoming a source of serious injuries at the time of impact.

Energy absorption devices have already formed the subject of several patent applications.

Patent application EP 0 550 321 relates to a pyrotechnic actuator with damped travel that can be used in any type of energy absorption system. This actuator comprises a pyrotechnic gas generator, a piston, a combustion chamber for pyrotechnic substances and a backpressure chamber, and also an intermediate chamber included between the said combustion chamber and one end of the piston. A channel connects the intermediate chamber to the backpressure chamber. The gas emitted by the generator pressurizes the intermediate chamber in order to oppose the movement of the piston and thus damp its travel, a portion of the said gas being conveyed through the channel towards the backpressure chamber.

The energy absorption systems according to the invention have a pyrotechnic gas generator that can deliver a variable quantity of gas, allowing the said systems to take account of certain parameters such as the speed of the vehicle at the time of the collision and the morphology of the driver. They can therefore be easily adapted to a high number of configurations. In addition, they are equipped with a device for regulating the pressure in the damping chamber, and this gives them particularly good performance and reliability.

The subject of the present invention relates to an energy absorption system for a safety device in a motor vehicle, comprising a pyrotechnic gas generator and a sliding piston that can be displaced in a damping chamber, the said generator being able to release gas into the said chamber for damping the piston, this system being characterized in that the gas generator delivers a variable quantity of gas and in that the damping chamber comprises a pressure-regulating device that is triggered above a threshold pressure attained in the said chamber.

The system according to the invention may be placed, for example, between the bonnet of a motor vehicle and the bonnet-carrying structure in order to damp the movement of the bonnet in the event of a head-on collision of the vehicle. During the accident, the bonnet advances by virtue of a specific device, for example one fitted with pyrotechnic actuators, and is then damped by the absorption system according to the invention. When the collision occurs at low speed, this will particularly allow deformation of the chassis to be prevented and thus reduce the cost of repairing the vehicle following the accident.

The system according to the invention may also be used for damping the movement of a bonnet of a motor vehicle subsequent to the impact of a pedestrian against the said bonnet. In this latter case, when the motor vehicle strikes a pedestrian frontally, the bonnet of the vehicle is raised by a certain height as it pivots about an axis of rotation situated towards the front of the vehicle. Generally, the pedestrian is tipped over and strikes the bonnet of the vehicle. The absorption system according to the invention, placed under the bonnet, makes it possible to damp the movement of the bonnet caused by the impact of the pedestrian against the said bonnet. The system according to the invention may also be used to protect the lower limbs of an occupant of a motor vehicle by placing the said system behind the dashboard of the vehicle, or to limit in an adjustable manner the force exerted by an occupant of a motor vehicle on his seatbelt during an impact, or to damp the impact of the driver against the steering column during a collision.

The absorption systems according to the invention operate subsequent to a collision between the motor vehicle and an external object. The said systems are subject to a first setting phase consisting in filling the damping chamber with gas before the piston starts to make the slightest displacement. When, for example, the system according to the invention is used for damping the movement of the bumper in the event of a head-on collision as stated above, the displacement of the bonnet, fixed to the piston of the device, causes the said piston to be displaced and the gas-filled damping chamber then damps the travel of the said piston.

To gain a good understanding of the text, a distinction has to be made between two categories of adaptation systems according to the invention:

those having only a single phase of operation those having two levels of operation. The latter are distinguished from those of the first category in that in the middle of the piston travel, a new series of pyrotechnic charges is fired to increase the pressure in the damping chamber and reinforce the damping of the said piston. The characteristics of the first level of operation are identical in all respects to those of the operating phase of the first category of absorption system. The second level starts with the firing of the new series of pyrotechnic charges.

The concepts of "damping" and "absorption" are identical.

Advantageously, a secondary chamber separates the damping chamber and the pyrotechnic gas generator and a non-return valve isolates the two chambers.

Preferably, the non-return valve only allows the gas to pass through in the outward direction from the secondary chamber towards the damping chamber. In this way, should there be excess pressure in the damping chamber, the gas will not be able to flow back up into the secondary chamber.

Advantageously, the gas emitted into the secondary chamber modifies the operating parameters of the pressure-regulating device.

Preferably, the pressure-regulating device is in connection with the secondary chamber and the gas emitted into the said secondary chamber exerts a pressure on the said device. Thus, the pressure-regulating device connects both the damping chamber and the secondary chamber situated upstream of the latter. The said device is conditioned by the pressure prevailing in the secondary chamber before acting in the damping chamber.

Advantageously, the damping chamber and the secondary chamber each exert on the pressure-regulating device a pressure with the same direction but oppositely directed effect.

Preferably, the pressure-regulating device is housed in a channel connecting the damping chamber to the secondary chamber, the said channel having an opening to the outside.

Advantageously, the pressure-regulating device is a valve consisting of a central spring comprising a closing part at each of its ends.

Preferably, the part for closing the damping chamber consists of a ball and the part for closing the secondary chamber consists of a secondary piston.

According to a first preferred embodiment of the invention, the gas generator comprises a plurality of pyrotechnic charges.

Advantageously, an ignition device makes it possible to ignite the pyrotechnic charges independently of one another.

Preferably, the ignition device can ignite several pyrotechnic charges simultaneously.

Advantageously, the ignition device can ignite the pyrotechnic charges with a time delay. In this way, the presence of several pyrotechnic charges within the same absorption system allows great flexibility of use of the latter since the ignition device that is associated with it allows, on the one hand, selection of the pyrotechnic charges to be initiated in combustion and, on the other hand definition of the timing of their initiation. Thus the charges can be ignited simultaneously or with time delays that can be set up to improve the operating conditions of the absorption device.

Advantageously, the pyrotechnic charges involved in the absorption system according to the invention all have different characteristics with regard to their chemical composition, their geometry, their dimensions or their mass. The characteristics of the ignition device associated with the characteristics of the pyrotechnic charges thus offer a multiplicity of combinations making it possible to deal with a very large number of configurations.

Preferably, the charges are each arranged in a housing provided with a burstable cover.

Advantageously, the covers are dimensioned to withstand the pressure of the secondary chamber and only burst under the ignition pressure of the corresponding charges.

According to another preferred embodiment of the invention, the gas generator comprises a pyrotechnic charge housed in a combustion chamber provided with a cover, and a device for closing off the said chamber. In this way, after the pyrotechnic charge has been caused to combust, the closing device is triggered to close the combustion chamber and halt the production of gas in the secondary chamber. The gas accumulates in the combustion chamber and finally causes the cover to rupture, thus allowing the evacuation of the gas to the outside.

Advantageously, the closing device comprises a pyrotechnic gas generator and a moving part capable of being displaced under the effect of the said gas in order to close off the combustion chamber. This is a slide part that slides in an enclosure under the effect of the gas emitted by a gas generator, in order to close off the combustion chamber.

The invention is also concerned with a damping method operating at 2 levels and involving an absorption system according to the invention, characterized in that
  i) in a first phase, a portion of the pyrotechnic charges is fired, placing the pressure-regulating device under stress on the one hand and pressurizing the damping chamber on the other hand,
  ii) in a second phase, when the pressure in the damping chamber, the volume of which decreases under the effect of the displacement of the piston subjected to an external stress, reaches a threshold value, the pressure-regulating device, the characteristics of which depend on the pressure in the secondary chamber, is triggered in order to evacuate gas and maintain a constant pressure in the damping chamber, the non-return valve preventing any flow of gas back up into the secondary chamber,
  iii) in a third phase, other pyrotechnic charges of the generator are fired in order to increase the pressure in the damping chamber and therefore increase the damping of the said piston, the events of the second phase of the method being repeated during this third phase.

The energy absorption devices according to the invention have the dual advantage of having a small space requirement and of being highly effective. They have a small space requirement insofar as the damping system does not exist as long as the gas generator has not been triggered and is created in the form of a gaseous surge not necessitating the intervention of additional solid parts specially designed for this damping function. They are highly effective because the multiplicity of pyrotechnic charges involved allows good control of the initial damping pressure, the latter being able, inter alia, to be adapted to the morphology of the driver and to the speed of the motor vehicle at the time of the collision. Finally, the absorption devices according to the invention are of simple design because the device for regulating the pressure of the damping chamber is conditioned by an already existing gas source.

A detailed description of three preferred embodiments of the invention is given below with reference to FIGS. 1 to 9.

FIGS. 5 and 6 represent the absorption system of FIG. 1 at two different stages of a second level of operation.

FIG. 7 is a view of a four-charge pyrotechnic gas generator of an absorption system according to the invention.

FIG. 8 is view of a one-charge pyrotechnic gas generator of an absorption system according to the invention.

FIG. 9 is a view of a two-charge pyrotechnic gas generator of an absorption system according to the invention having an operation at two levels.

Figure 1:
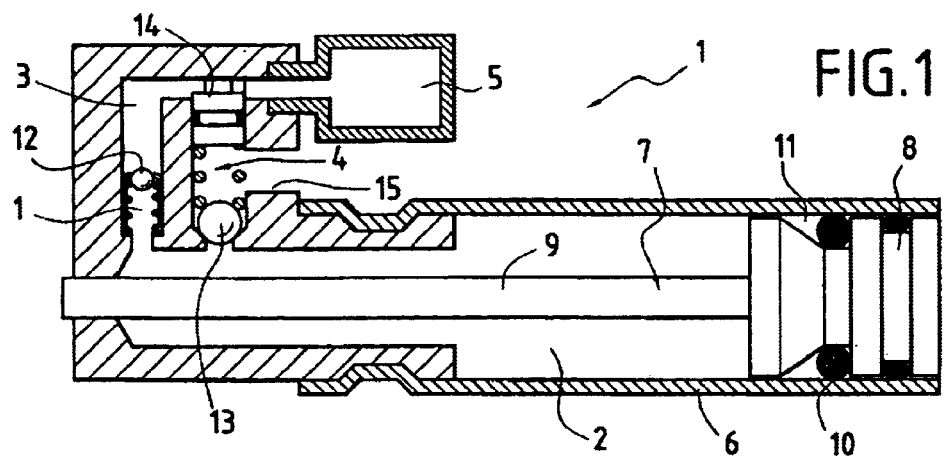
FIG. 1 is a schematic view in axial section of an absorption system according to the invention provided with a gas generator with four pyrotechnic charges.

With reference to FIG. 1, an absorption system 1 according to the invention comprises a damping chamber 2, a secondary chamber 3, a pressure-regulating device 4 and a gas generator 5. The damping chamber 2 is delimited by a hollow cylinder 6 in which is housed a piston 7 having a cylindrical body 8 extended by a cylindrical rod 9 of smaller diameter. The diameter of the said body 8 being substantially smaller than the internal diameter of the damping chamber 2. The piston 7 comprises a non-return device in the form of balls 10 inserted into a space 11 situated between the body 8 of the piston 7 and the internal wall of the damping chamber 2. This is an annular space 11 having a variable cross section, a portion of which may receive a ball 10.

The secondary chamber is cylindrical and has an L shape with two cylindrical portions that are perpendicular to one another and of different diameters. The said secondary chamber 3 is connected to the damping chamber 2 so that the two chambers 2, 3 have an overall ⌊⌋ shape. At its end that comes into communication with the damping chamber 2, the secondary chamber 3 comprises a non-return valve 11 embodied by a spring and a ball 12 that is enclosed in a hollow cylinder provided at each of its two ends with an opening, with the result that the ball 12 closes off one of the two openings under the effect of the spring, which is slightly preloaded, the diameter of the said ball 12 being greater than the diameter of the opening against which it bears. With respect to the secondary chamber 3, the ball 12 is placed upstream of the spring. In other words, the two chambers 2, 3 are isolated from one another by the said valve 11. The pressure-regulating device 4 is placed in a channel connecting the damping chamber 2 and the portion of the secondary chamber 3 that is parallel to the said damping chamber 2. The channel in which is housed the pressure-regulating device 4 and the portion of the secondary chamber 3 comprising the valve 11 are mutually parallel and are perpendicular to the damping chamber 2 and also to the other portion of the secondary chamber 3. The pressure regulating device 4 consists of an exhaust valve comprising a central spring having a closing part at each of its ends, the closing part that closes off the damping chamber 2 consisting of a ball 13 and the closing part that closes off the secondary chamber 3 consisting of a secondary piston 14. The central spring is slightly preloaded and simultaneously repels the ball 13 and the secondary piston 14. The channel housing the pressure-regulating device 4 has in its central portion, which is the portion housing the spring, an opening 15 to the outside of the absorption system 1. The pyrotechnic gas generator 5 is connected to the free end of the secondary chamber 3.

With reference to FIG. 7, according to a first preferred embodiment of the invention, the generator 50 has four pyrotechnic charges 51 each housed in a cylindrical housing 52 comprising an ignition device 53 at one of their ends and, at the other end, a bursting cover 54 that is calibrated to rupture under the effect of the ignition pressure but to withstand the pressure of the secondary chamber 3.

With reference to FIG. 8, according to a second preferred embodiment of the invention, the generator 60 comprises a pyrotechnic charge 61 housed in a combustion chamber 62 provided with a burstable cover 63 and an ignition system 66, and a device 64 for closing off the said chamber 62. The closing device 64 has a gas generator 65 and a slide part 67 that is able to be displaced under the effect of gas emitted by the said generator 65 in order to close the combustion chamber 62. The generator 60 opens onto the secondary chamber 3.

With reference to FIG. 9, according to a third preferred embodiment of the invention, the generator 70 comprises two generators 60 of the generator type depicted in FIG. 8, which are joined to one another and which both open onto the secondary chamber 3. Each of the two generators 60 has, upstream of the secondary chamber 3, a burstable cover 71 for preventing combustion in one of the two generators 60 being initiated by the other generator 60.

The operating mode of an absorption system according to the invention, comprising the three above-described embodiments, is as follows.

Figure 2:
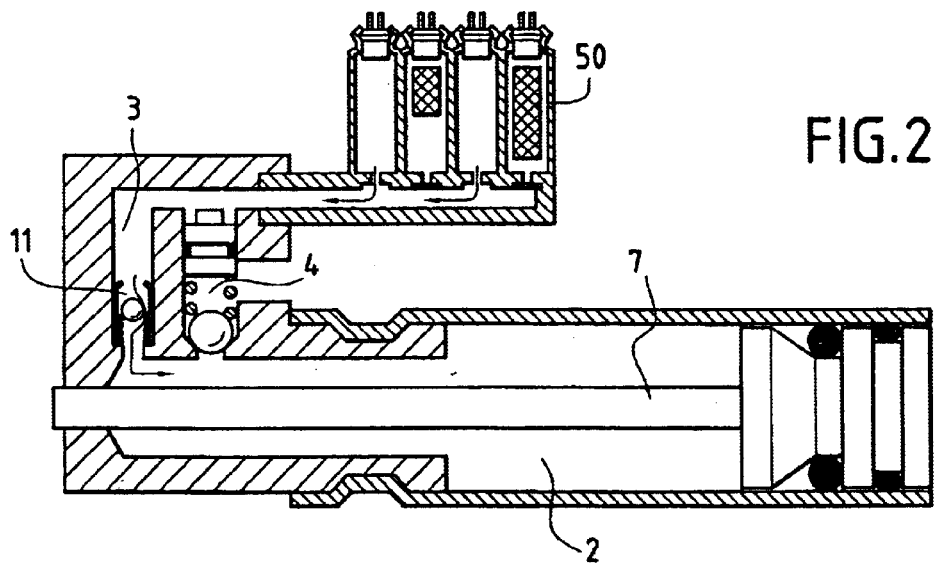
FIGS. 2, 3 and 4 represent the absorption system of FIG. 1 at various stages of its operation.

According to the first preferred embodiment of the invention, with reference to FIG. 2, two of the four pyrotechnic charges 51 of the generator 50 are caused to combust, leading to the covers 54 opening in their respective housing 52. The gas pervades the secondary chamber 3 in the direction of the arrows of the figure then passes through the valve 11 in the direction of the arrows before pervading the damping chamber 2. The pressure of the secondary chamber 3 acts on the secondary cylinder 14 of the pressure-regulating device 4, accentuating the compression of the central spring of the said device 4 and increasing the bearing force of the ball 13 that closes off the damping chamber 2.

Figure 3:
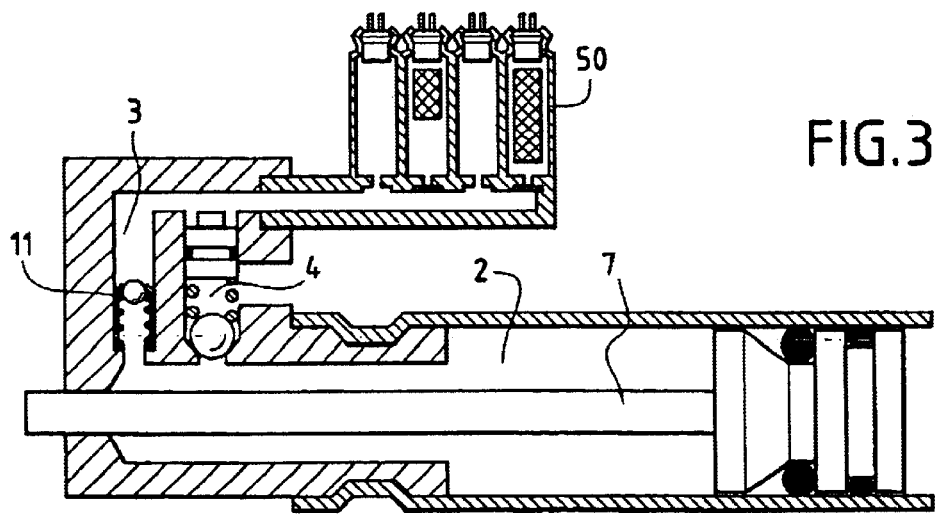
Figure 4:
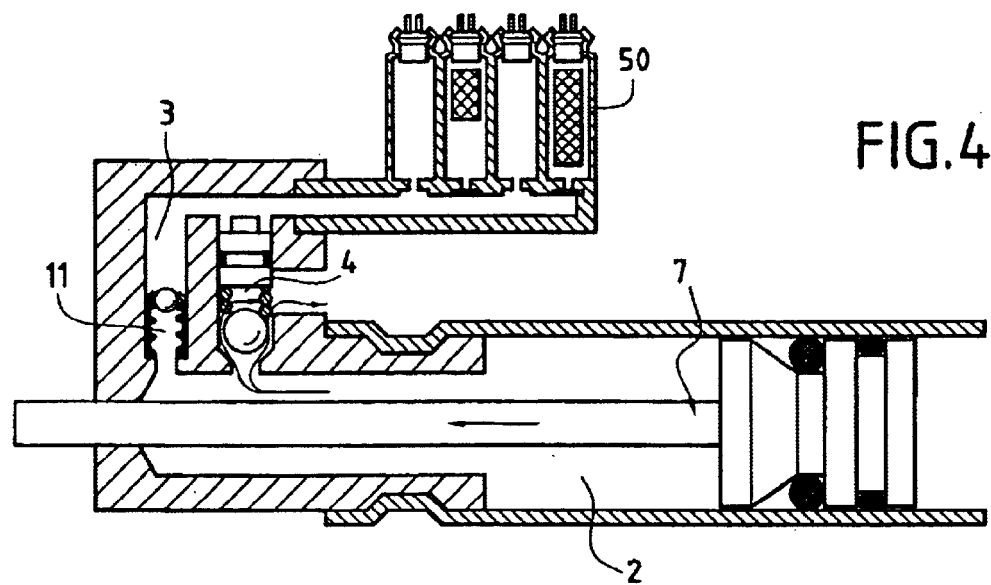

This is the setting phase of the absorption system 1. The system according to the invention will be used for example as an absorber of the displacement of the bumper of a motor vehicle being subjected to a head-on collision. During the accident, the bumper first of all advances in the direction of the external object against which the collision occurs. Under the effect of the impact of the vehicle, the bumper is then damped by virtue of the absorption system according to the invention. With reference to FIG. 3, during the impact the bumper is therefore subject to a forceful displacement that drives the piston 7 to which it is fixed in a direction that accentuates the exiting of its rod 9 to the outside of the damping chamber 2. With reference to FIG. 4, the damping chamber 2 is then compressed under the effect of the displacement of the piston 7 and, above a threshold pressure inside the said chamber 2, the ball 13 is repelled, creating an opening for the gas, which then escapes through the opening 15 of the channel housing the pressure-regulating device 4. The damping of the said piston 7 is carried out at constant pressure.

Figure 5:
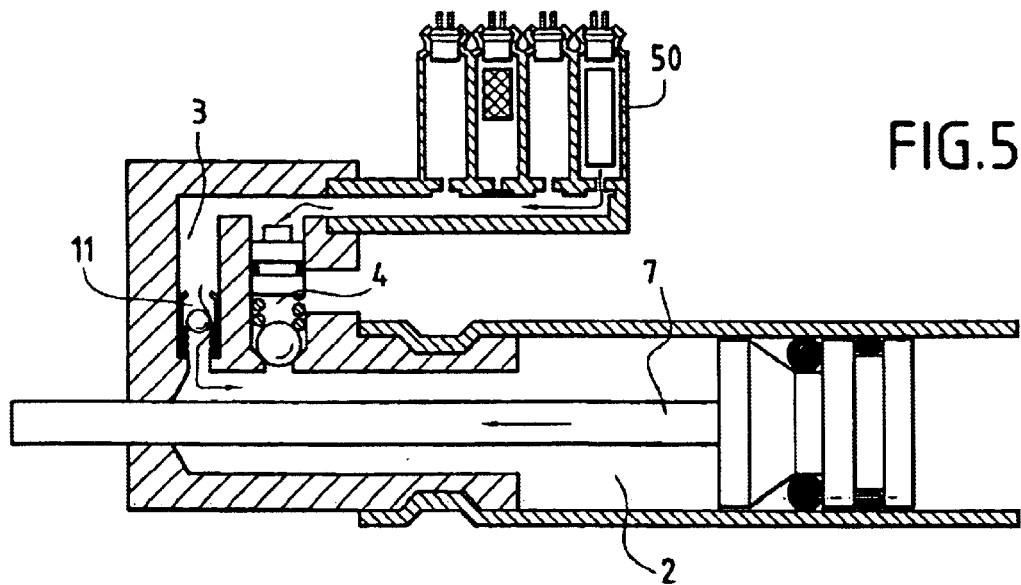

The absorption systems having two levels of operation have an additional phase that follows the phase described above. With reference to FIG. 5, this second phase starts when a third pyrotechnic charge 51 has been fired, while the piston 7 continues its travel in the chamber 2 that has been pressurized by the gas resulting from the combustion of the first pyrotechnic charges 51. The gas supplied by the combustion of this additional charge 51 reaches the damping chamber 2 after the pressure exerted on the pressure-regulating device 4 by the gas newly produced in the secondary chamber 3 has caused the said device 4 to close again. With reference to FIG. 6, this surge of additional gas into the damping chamber 2 increases the damping of the piston 7 and again triggers the pressure-regulating device 4 to evacuate some of the gas from the said chamber 2. During this second phase, the damping of the piston 7 is increased and is carried out at constant pressure.

The operating mode of the second preferred embodiment of the invention differs from that of the first embodiment described above in terms of the supply of gas by the pyrotechnic generator, all the other phases being identical. With reference to FIG. 8, the pyrotechnic charge 61 situated on the combustion chamber 62 is fired by the ignition system 66 and the gas supplied then pervades the secondary chamber 3. After a predetermined time, the closing device 64 is triggered under the effect of the firing of its gas generator 65, causing the slide part 67 to be displaced in a sliding space in order to close the combustion chamber 62. The gas then accumulates in the said chamber 62 and finally ruptures the cover 63 to be evacuated to the outside. With such a gas generator 60, which allows a variable quantity of gas to be emitted depending on the instant at which the closing device 64 is triggered, the absorption system according to the invention is able only to have a single operating phase.

The operating mode of the third preferred embodiment of the invention differs from that of the first embodiment described above concerning an absorption system having two levels of operation in terms of the supply of gas by the pyrotechnic generator 70, all the other phases being identical. With reference to FIG. 9, the first phase is governed by the combustion of the first gas generator 60 according to the description given for the second preferred embodiment of the invention. The second phase is governed by the combustion of the second gas generator 60, which is similar to the first generator.

As described above, the absorption system according to the invention may be adapted for various applications, such as, for example, for damping the movement of a bonnet of a motor vehicle when a pedestrian strikes the said bonnet, for damping the movement of a steering column caused by the impact of the driver against the said column, or for adjusting, during an impact, the force exerted by an occupant of a vehicle on his seatbelt.

What is claimed is:

1. An energy absorption system for safety devices in a motor vehicle, comprising a pyrotechnic gas generator and a sliding piston that can be displaced in a damping chamber, the generator being able to deliver a variable quantity of gas into the damping chamber for damping the piston, and the damping chamber comprises a pressure-regulating device that is triggered above a threshold pressure, wherein a secondary chamber separates the damping chamber and the pyrotechnic gas generator, a non-return valve isolates the secondary chamber and the damping chamber, the pressure-regulating device is in connection with the secondary chamber, and the gas emitted into the secondary chamber exerts a pressure on the pressure-regulating device.

2. The absorption system according to claim 1, wherein the gas emitted into the secondary chamber modifies operating parameters of the pressure-regulating device.

3. The absorption system according to claim 1, wherein the damping chamber and the secondary chamber each exert on the pressure-regulating device a pressure with a same direction but oppositely directed effect.

4. The absorption system according to claim 1, wherein the pressure-regulating device is housed in a channel connecting the damping chamber to the secondary chamber, the channel having an opening to the outside.

5. The absorption system according to claim 1, wherein the non-return valve only allows the gas to pass from the secondary chamber towards the damping chamber.

6. The absorption system according to claim 1, wherein the pressure-regulating device is a valve comprising a central spring and a closing part at each end.

7. The absorption system according to claim 6, wherein a first closing part for closing off the damping chamber comprises a ball and a second closing part for closing off the secondary chamber comprises a secondary piston.

8. The absorption system according to claim 1, wherein the gas generator comprises a plurality of pyrotechnic charges.

9. The absorption system according to claim 8, wherein an ignition device makes it possible to ignite the pyrotechnic charges independently of one another.

10. The absorption system according to claim 9, wherein the ignition device can ignite several pyrotechnic charges simultaneously.

11. The absorption system according to claim 9, wherein the ignition device can ignite the pyrotechnic charges with a time delay.

12. The absorption system according to claim 8, wherein the pyrotechnic charges have different characteristics.

13. The absorption system according to claim 8, wherein the pyrotechnic charges are each arranged in a housing provided with a burstable cover.

14. The absorption system according to claim 1, wherein the gas generator comprises a pyrotechnic charge housed in a combustion chamber provided with a cover, and a closing device for closing off the combustion chamber.

15. The absorption system according to claim 14, wherein the closing device comprises a pyrotechnic gas generator and a slide part capable of being displaced under the effect of the gas in order to close off the combustion chamber.

16. A damping method rating at two levels and involving the absorption system according to claim 8, wherein i) in a first phase, at least one pyrotechnic charge is fired, placing the pressure-regulating device under stress on one hand and pressurizing the damping chamber on another hand, ii) in a second phase, when pressure in the damping chamber, a volume of which decreases under an effect of displacement of the piston subjected to an external stress, reaches a threshold value, the pressure-regulating device, the characteristics of which depend on pressure in the secondary chamber, is triggered in order to evacuate gas and maintain a constant pressure in the damping chamber, the non-return valve preventing any flow of gas back up into the secondary chamber, and iii) in a third phase, other pyrotechnic charges of the generators are fired in order to increase the pressure in the damping chamber and therefore increase damping of the said piston, the events of the second phase of the method being repeated during the third phase.

17. A method for damping a bumper of a motor vehicle in an event of a head-on collision of the vehicle which comprises utilizing the absorption system of claim 1.

18. A method for protecting lower limbs of an occupant of a motor vehicle which comprises utilizing the absorption system of claim 1.

19. A method for damping an impact of a pedestrian against a bonnet of a motor vehicle which comprises utilizing the absorption system of claim 1.

20. A method for damping a steering column of a motor vehicle which comprises utilizing the absorption system of claim 1.

* * * * *